United States Patent
Carpenter et al.

(10) Patent No.: US 7,350,058 B2
(45) Date of Patent: Mar. 25, 2008

(54) SHIFT AND INSERT INSTRUCTION FOR OVERWRITING A SUBSET OF DATA WITHIN A REGISTER WITH A SHIFTED RESULT OF ANOTHER REGISTER

(75) Inventors: Paul Matthew Carpenter, Cambridge (GB); Simon Andrew Ford, Cambridge (GB)

(73) Assignee: ARM Limited, Cambridge (GB)

( * ) Notice: Subject to any disclaimer, the term of this patent is extended or adjusted under 35 U.S.C. 154(b) by 287 days.

(21) Appl. No.: 10/928,748

(22) Filed: Aug. 30, 2004

(65) Prior Publication Data

US 2005/0204117 A1    Sep. 15, 2005

(30) Foreign Application Priority Data

Mar. 10, 2004    (GB) ................. 0405407.8

(51) Int. Cl.
    *G06F 7/00*    (2006.01)
(52) U.S. Cl. ............... 712/224; 712/208; 712/300; 377/54
(58) Field of Classification Search ............. 712/223, 712/224, 208, 300; 377/54, 64
    See application file for complete search history.

(56) References Cited

U.S. PATENT DOCUMENTS

| | | | |
|---|---|---|---|
| 4,023,023 A | 5/1977 | Bourrez et al. | |
| 4,569,016 A | 2/1986 | Hao et al. | |
| 4,876,660 A | 10/1989 | Owen et al. | |
| 5,301,289 A | 4/1994 | Suzuki et al. | |
| 5,408,670 A | 4/1995 | Davies | |
| 5,481,743 A | 1/1996 | Baxter | |
| 5,530,817 A | 6/1996 | Masubuchi | |
| 5,761,103 A | 6/1998 | Oakland et al. | |
| 5,808,875 A | 9/1998 | McMahon et al. | |
| 5,822,619 A | 10/1998 | Sidwell | |
| 5,826,096 A | 10/1998 | Baxter | |
| 5,838,984 A | 11/1998 | Nguyen et al. | |
| 5,859,789 A | 1/1999 | Sidwell | |
| 5,859,790 A | 1/1999 | Sidwell | |
| 5,864,703 A | 1/1999 | van Hook et al. | |
| 5,870,618 A | 2/1999 | Fujikawa et al. | |
| 5,875,355 A | 2/1999 | Sidwell et al. | |
| 5,881,302 A | 3/1999 | Omata | |
| 5,884,069 A | 3/1999 | Sidwell | |
| 5,893,145 A | 4/1999 | Thayer et al. | |
| 5,898,896 A | 4/1999 | Kaiser et al. | |

(Continued)

FOREIGN PATENT DOCUMENTS

EP    1 197 845    4/2002

(Continued)

OTHER PUBLICATIONS

C. Hansen, "Architecture of a Broadband Mediaprocessor" IEEE, Digest of Papers of the Computer Society Computer Conference, Feb. 1996, pp. 334-340.

*Primary Examiner*—Tonia L. Meonske
(74) *Attorney, Agent, or Firm*—Nixon & Vanderhye P.C.

(57) ABSTRACT

A data processing system 2 is provided which supports shift-and-insert instructions SLI, SRI which serve to shift a source data value by a specified shift amount and then insert bits from that shifted value other than the shifted-in bits into a destination value with the remaining bits within that destination value being unaltered.

22 Claims, 3 Drawing Sheets

U.S. PATENT DOCUMENTS

| | | | |
|---|---|---|---|
| 5,907,865 A | 5/1999 | Moyer | |
| 5,933,650 A | 8/1999 | van Hook et al. | |
| 5,937,178 A | 8/1999 | Bluhm | |
| 5,961,637 A | 10/1999 | Sturges et al. | |
| 5,963,744 A | 10/1999 | Slavenburg et al. | |
| 5,973,705 A | 10/1999 | Narayanaswami | |
| 5,996,066 A * | 11/1999 | Yung | 712/221 |
| 6,009,191 A | 12/1999 | Julier | |
| 6,009,508 A | 12/1999 | May et al. | |
| 6,038,583 A | 3/2000 | Oberman et al. | |
| 6,047,304 A | 4/2000 | Ladwig et al. | |
| 6,058,465 A | 5/2000 | Nguyen | |
| 6,085,213 A | 7/2000 | Oberman et al. | |
| 6,088,783 A | 7/2000 | Morton | |
| 6,100,905 A | 8/2000 | Sidwell | |
| 6,144,980 A | 11/2000 | Oberman | |
| 6,145,077 A | 11/2000 | Sidwell et al. | |
| 6,173,366 B1 | 1/2001 | Thayer et al. | |
| 6,209,017 B1 | 3/2001 | Lim et al. | |
| 6,223,198 B1 | 4/2001 | Oberman et al. | |
| 6,223,277 B1 | 4/2001 | Karguth | |
| 6,223,320 B1 | 4/2001 | Dubey et al. | |
| 6,269,384 B1 | 7/2001 | Oberman | |
| 6,292,888 B1 | 9/2001 | Nemirovsky et al. | |
| 6,295,599 B1 | 9/2001 | Hansen et al. | |
| 6,298,438 B1 | 10/2001 | Thayer et al. | |
| 6,300,952 B1 | 10/2001 | Sidwell et al. | |
| 6,334,176 B1 | 12/2001 | Scales, III et al. | |
| 6,385,713 B2 | 5/2002 | Yung | |
| 6,408,345 B1 | 6/2002 | Fuoco et al. | |
| 6,430,684 B1 * | 8/2002 | Bosshart | 712/300 |
| 6,546,480 B1 | 4/2003 | Mandavilli et al. | |
| 6,564,314 B1 | 5/2003 | May et al. | |
| 6,662,292 B1 | 12/2003 | Wilson | |
| 6,748,521 B1 | 6/2004 | Hoyle | |
| 2002/0133682 A1 | 9/2002 | Hansen et al. | |
| 2003/0131030 A1 * | 7/2003 | Sebot et al. | 708/209 |

FOREIGN PATENT DOCUMENTS

| | | |
|---|---|---|
| GB | 2 352 065 | 1/2001 |

* cited by examiner

```
SLI   dest, src, #imm
SRI   dest, src, #imm
SLI   dest, src1, src2
```

SHIFT AND INSERT INSTRUCTION FOR OVERWRITING A SUBSET OF DATA WITHIN A REGISTER WITH A SHIFTED RESULT OF ANOTHER REGISTER

BACKGROUND OF THE INVENTION

1. Field of the Invention

This invention relates to data processing systems. More particularly, this invention relates to the insertion of bits within a data word under program control.

2. Description of the Prior Art

It is known within data processing systems to pack together a plurality of fields of bits within a single data word. As an example, within a 16 bit data word it may be desired to pack three colour component values respectively representing red, green and blue values, two of which are of 5 bits in length and one of which is 6 bits in length. It is often the case that these different component values will be separately processed and their magnitudes separately calculated. After such calculations the separate components require assembling together within a single data word such that they may be stored in a more compact form and more readily manipulated on a pixel-by-pixel basis.

In order to achieve such data packing, one possible solution is to provide program instructions which specify both a length of a bit field within a source register which is to be inserted into a destination register and the position within the destination register at which that bit field is to be inserted. Such an instruction will typically have to specify the source register, the destination register, the bit field length and the bit field insertion position. Having to specify four separate parameters within a single instruction in this way places a disadvantageously high demand upon the instruction bit space available within the instruction and makes such instructions disadvantageous in terms of the instruction bit space they consume.

SUMMARY OF THE INVENTION

Viewed from one aspect the present invention provides apparatus for processing data, said apparatus comprising:

a plurality of registers operable to store data values to be manipulated;

processing logic operable to perform a data processing operation upon one or more data values stored within said plurality of registers; and an instruction decoder responsive to a program instruction to control said processing logic to perform a data processing operation specified by said program instruction; wherein said instruction decoder is responsive to a shift-and-insert instruction to control said processing logic to perform a shift-and-insert data processing operation yielding a result having a result value given by:

shifting a first data value stored within a first register by a shift amount of N bit positions to form a shifted value including N shifted-in bits, where N has one of a plurality of different non-zero values; and inserting respective bits of said shifted value, other than said N shifted-in bits, into corresponding bit positions in a second data value stored within a second register with bits within said second data value corresponding to said N shifted-in bits being unaltered thereby forming said result.

The present invention recognises that a large proportion of the cases in which it is desired to use such instructions the full flexibility of being able to separately specify the bit field length and the bit field position is not required. Instead, a single parameter specifying the amount of shift to be applied to the source value controls the starting position at which bits of the source value are written into the destination value. The bits written into the destination value extend from the starting position to the appropriate end of the destination value depending upon the shift direction of the instruction concerned. It may be that a greater number of bits are inserted than are ultimately required. However, the present technique recognises that in a large proportion of cases multiple such instructions are executed and the excess bits written in one instruction will be over-written with the desired data in a following instruction such that the final packed data value will contain the correct bits as desired. Thus, the packing type of operations, or other bit assembly operations, can be achieved with instructions having an advantageously small instruction bit space requirement. It will be appreciated that the expression of the invention as set out above is made in terms of a shift-and-insert instruction yielding a result having a result value given by a specified shift operation and a specified insert operation. It will be appreciated that the actual mechanisms employed to achieve a result value the same as if such a shift and insert had been performed can vary. Such variant mechanisms and steps are encompassed by the present technique. The shifting and inserting steps are one way of expressing how the desired end result is related to the inputs but the same relationship between inputs and outputs may be achieved and expressed in a variety of different ways. These alternatives are encompassed within the present technique.

The shift amount could be specified as a value stored within a register specified within the instruction or alternatively and preferably as an immediate value encoded within the shift-and-insert instruction itself.

The first and second registers are advantageously specified by a source register specifying fields, both relative to the registers of a register bank. A destination register specifying field (optionally shared with one of the first register or second register) may also be used.

It will be appreciated that the shifting of the present technique may be either right shifting or left shifting depending upon the circumstances and the desired form of packing or bit insertion.

It is possible that the first data value and the second data value could have different bit lengths and be stored in registers of different lengths although in preferred embodiments the first data value and the second data value have the same number of bits.

As previously mentioned it will be appreciated that the relationship between the inputs and the outputs as set out above may be implemented in a variety of different ways although a preferred way is to use a shift of the first value and to form a mask value for selecting which bits within the second data value are replaced by corresponding bits within the shifted data value and which bits within the second data value are unaltered. This mask value can advantageously be formed by a shift upon a starting mask or by alternative techniques such as a decode of the instruction directly forming the mask.

The present technique may be used with advantage both within scalar processing systems and single instruction multiple data packets (SIMD) processing systems.

Viewed from another aspect the present invention a method of processing data, said method comprising the steps of:

storing data values to be manipulated within a plurality of registers;

performing a data processing operation using processing logic upon one or more data values stored within said plurality of registers; and in response to a program instruction, using an instruction decoder to control said processing logic to perform a data processing operation specified by said program instruction; wherein said instruction decoder is responsive to a shift-and-insert instruction to control said processing logic to perform a shift-and-insert data processing operation yielding a result having a result value given by:

shifting a first data value stored within a first register by a shift amount of N bit positions to form a shifted value including N shifted-in bits, where N has one of a plurality of different non-zero values; and inserting respective bits of said shifted value, other than said N shifted-in bits, into corresponding bit positions in a second data value stored within a second register with bits within said second data value corresponding to said N shifted-in bits being unaltered thereby forming said result.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2:
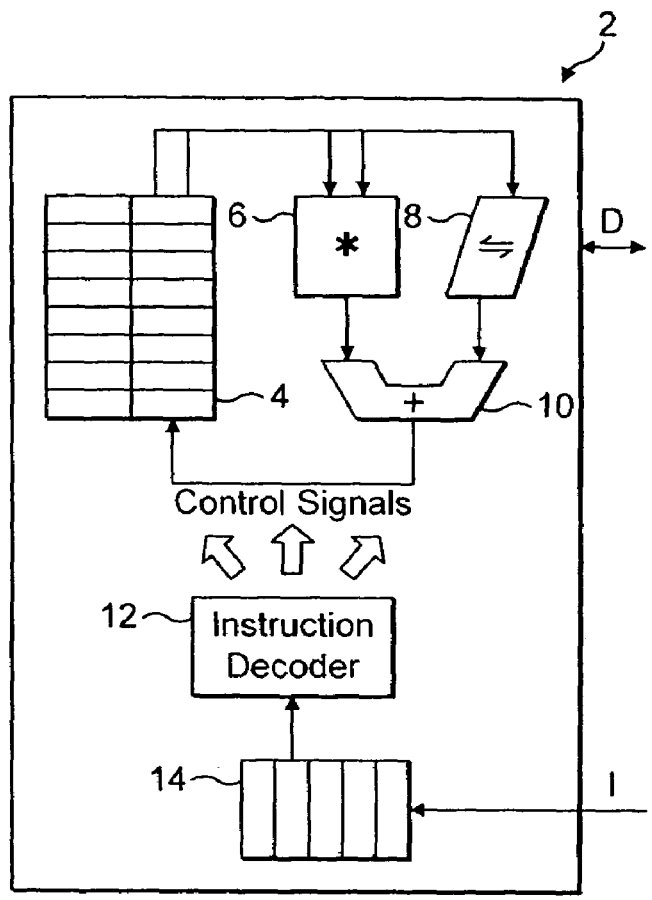
FIG. 1 schematically illustrates a data processing system of the type which may utilise the present techniques.
FIG. 2 schematically illustrates the syntax of three different shift-and-insert instructions in accordance with one example of the present technique.

FIG. 1 schematically illustrates a data processing system 2 which may be in the form of an integrated circuit including a register bank 4, a multiplier 6, a shifter 8 and an adder 10. The register bank 4, the multiplier 6, the shifter 8 and the adder 10 can be considered to form processing logic for executing desired data processing operations under control of control signals generated by an instruction decoder 12. The instruction decoder 12 is itself responsive to program instructions loaded into an instruction pipeline 14. It will be appreciated that the data processing system of FIG. 2 will typically contain many more elements, but these have been omitted for the sake of clarity. In operation, program instructions are fetched into the instruction pipeline 14 and when they reach an execute stage within the instruction pipeline 14 are used by the instruction decoder 12 to generate control signals which configure the various elements of the processing logic 4, 6, 8, 10 to execute the desired data processing operation. The processing logic will typically include many further elements for providing processing operations other than the simple multiply, shift and add operations illustrated in FIG. 1.

FIG. 2 schematically illustrates the syntax of some example shift-and-insert instructions which may be supported by the data processing system 2 of FIG. 1. A shift left and insert instruction SLI includes a register field specifying a destination register dest, a register field specifying a source register src and a field specifying an immediate value #imm. The source register contains the data value which is to be shifted and then inserted into the destination register with some of the bits within the destination register being unaltered. The immediate value #imm specifies the amount of shift applied to the source register value before the insertion takes place and also effectively the position at which the insertion takes place as will be described further below.

FIG. 2 illustrates a right shifting variant of the above instruction, namely an SRI instruction. There is also illustrated a variant of the left shifted instruction in which the shift value is specified by a second source register src2.

It will be appreciated that the syntax and exact form of the instructions as illustrated in FIG. 1 is only one example and different embodiments of the present technique may use instruction representations and syntaxes which vary considerably.

Figure 3:
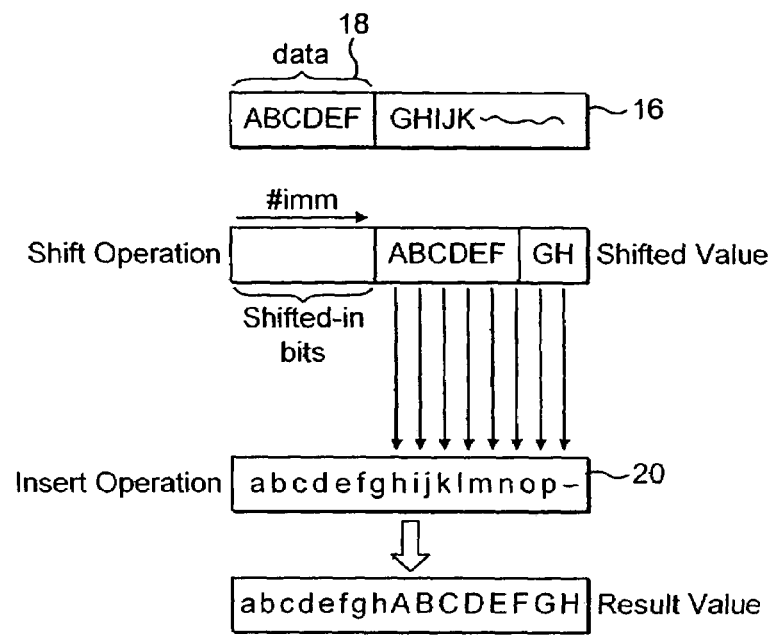
FIG. 3 schematically illustrates the action of a shift-and-insert instruction.

FIG. 3 illustrates one example of a shift and insert operation. A register 16 contains a source value. This source value contains a data portion 18, such as a pixel value. The portion of the register 16 outside of the data portion 18 may represent nothing meaningful or may be a fractional part of the data value which it is desired to discard.

The value within the register 16 is in this example subject to a right shift by an amount specified by the immediate field #imm within the SRI instruction concerned. At the left hand end of the register, shifted-in bits are introduced into the shifted value which is generated. This is normal shift operation behavior.

The destination value is held within a register 20 and a portion of the shifted value other than the shifted-in bits is written into this destination value replacing the corresponding bits initially stored within the destination value. The bits within the destination value 20 correspond to the shifted-in bits within the shifted value are not replaced and are left unaltered. The final result value contains the original destination value with the inserted bits from the shifted value replacing its original bits at those corresponding positions. It will be seen in the current example that bits from the shifted value other than only the data portion 18 have been inserted within the result value, namely bits G and H. If significant, then these unwanted bits can be overwritten by further bit values in a subsequence shift-and-insert operation, as desired.

Figure 4:
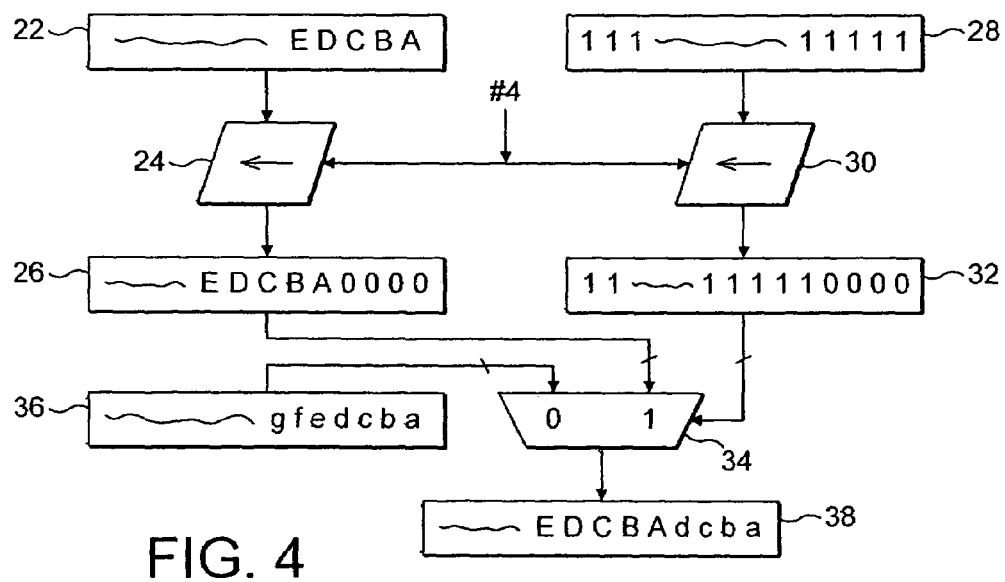
FIG. 4 schematically illustrates a hardware arrangement for performing a shift-and-insert operation.

FIG. 4 schematically illustrates a hardware representation as to how the shift-and-insert instruction can be implemented. The source register 22 supplies its value to, in this example, a left shifter 24. It will be appreciated that for the right shifting variants of the instruction right shifting circuits will be used instead. The shift amount is specified in this example by an immediate value of #4. The left shifter 24 produces a shifted value 26 with four shifted-in zero values in its four right most bit positions. In parallel with the generation of the shifted value 26, a mask value is produced by taking a starting mask value 28 containing all ones and subjecting this to the same shift as is being applied to the source value 22 with its own left shifter 30. The shifted-in values into the mask value are again zeros and this results in a shifted mask 32. The shifted mask 32 can then be used as a multi-bit control signal supplied to a multi-bit multiplexer 34 which selects either bits from the shifted value 26 or bits from the destination value 36 to feed to a result value 38.

Figure 5:
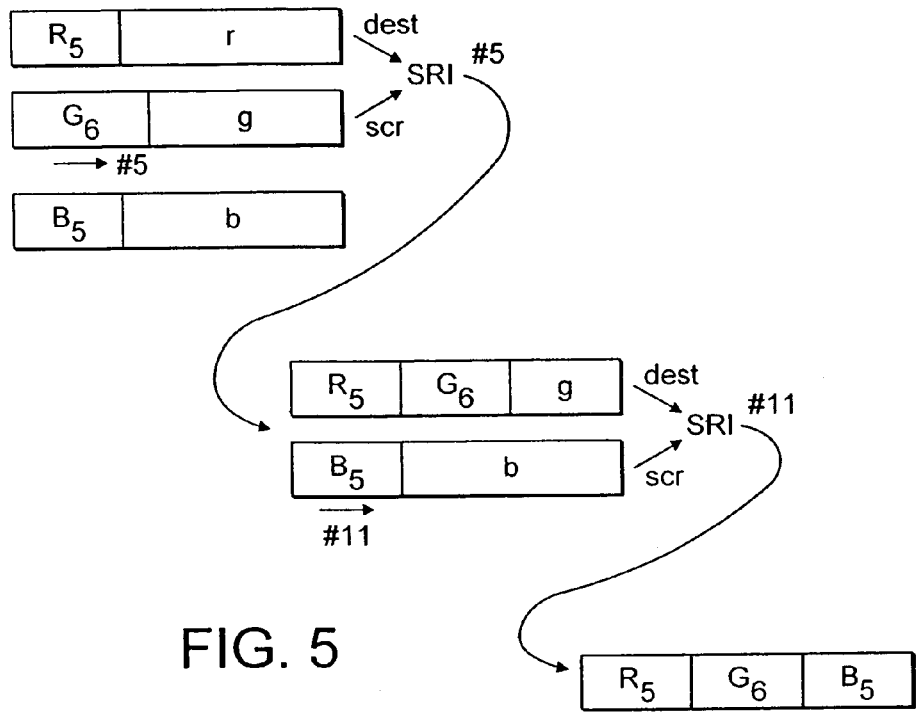
FIG. 5 illustrates an example of a pixel value packing operation within a scalar processing system.

FIG. 5 illustrates a scalar packing operation of red, green and blue pixel value components into a 16 bit result value.

The first operation executes upon the red and green component values using a right shift-and-insert instruction with a shift amount of five bit positions. This leaves the 5-bit red component $R_5$ unaltered within the result but writes in the green component $G_6$ as well as its remainder into that result. The second instruction takes the combined red and green component and inserts into it the blue component $B_5$ by performing a right shift-and-insert instruction with a shift amount of 11 bit positions such that the blue component $B_5$ abuts the end of the already inserted green component $G_6$ and fills the remaining positions within the 16 bit result value.

Figure 6:
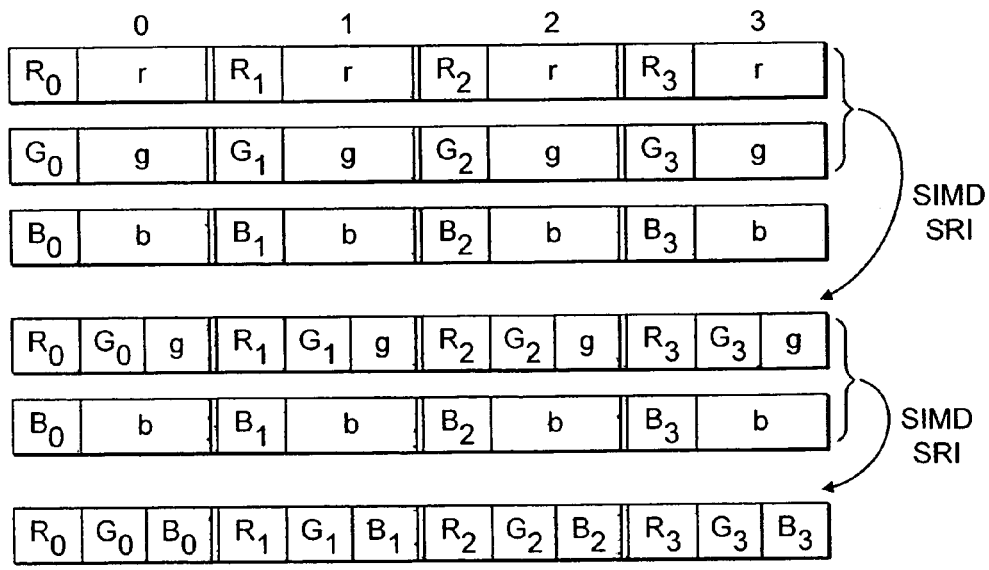
FIG. 6 schematically illustrates a pixel packing operation within a single instruction multiple data system.

FIG. 6 illustrates the same type of packing operation as illustrated in FIG. 5 but in this case performed within a single instruction multiple data (SMID) system. As will be appreciated the same shift-and-insert operation is separately performed upon each data lane within the SIMD system to enable four sets of pixel values to be packed together in parallel using two SIMD right shift-and-insert instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a plurality of registers operable to store data values to be manipulated;
   processing logic operable to perform a data processing operation upon one or more data values stored within said plurality of registers; and
   an instruction decoder responsive to a program instruction to control said processing logic to perform a data processing operation specified by said program instruction; wherein
   said instruction decoder is responsive to a shift-and-insert instruction to control said processing logic to perform a shift-and-insert data processing operation yielding a result having a result value given by:
   shifting a first data value stored within a first register by a shift amount of N bit positions to form a shifted value including N shifted-in bits, where N has one of a plurality of different non-zero values; and
   inserting all respective bits of said shifted value, other than said N shifted-in bits and independently of any parameter specified by said shift-and-insert instruction, into corresponding bit positions in a second data value stored within a second register with bits within said second data value corresponding to said N shifted-in bits being unaltered thereby forming said result; wherein said shift-and-insert instruction includes a register specifying field specifying a register within a register bank to be used as said first register; and wherein said shift-and-insert instruction includes a register specifying field specifying a register within a register bank to be used as said second register.

2. Apparatus as claimed in claim 1, wherein said shift-and-insert instruction includes an immediate value specifying said shift amount of N bit positions.

3. Apparatus as claimed in claim 1, wherein a shift-and-insert instruction includes a register specifying field specifying a register within a register bank to be used as a destination register.

4. Apparatus as claimed in claim 3, wherein said register specifying field for said destination register is shared with one of said first register and second register.

5. Apparatus as claimed in claim 1, wherein said first data value is right shifted.

6. Apparatus as claimed in claim 1, wherein said first data value is left shifted.

7. Apparatus as claimed in claim 1, wherein said first data value and said second data value have the same number of bits.

8. Apparatus as claimed in claim 1, wherein, in response to said shift-and-insert instruction, said processing logic is operable to shift said first value.

9. Apparatus as claimed in claim 1, wherein, in response to said shift-and-insert instruction, said processing logic is operable to form a mask value for selecting which bits within said second data value are replaced by corresponding bits within said shifted data value and which bits within said second data value are unaltered.

10. Apparatus as claimed in claim 1, wherein said processing logic is single instruction multiple data processing logic and said first register and said second register are respective portions of a first single instruction multiple data register and a second single instruction multiple data register, said shift-and-insert instruction being operable to control execution in parallel of a plurality of shift-and-insert operations in respective processing lanes.

11. Apparatus as claimed in claim 1, wherein said processing logic is scalar processing logic.

12. A method of processing data, said method comprising the steps of:
   storing data values to be manipulated within a plurality of registers;
   performing a data processing operation using processing logic upon one or more data values stored within said plurality of registers; and
   in response to a program instruction, using an instruction decoder to control said processing logic to perform a data processing operation specified by said program instruction; wherein
   said instruction decoder is responsive to a shift-and-insert instruction to control said processing logic to perform a shift-and-insert data processing operation yielding a result having a result value given by:
   shifting a first data value stored within a first register by a shift amount of N bit positions to form a shifted value including N shifted-in bits, where N has one of a plurality of different non-zero values; and
   inserting all respective bits of said shifted value, other than said N shifted-in bits and independently of any parameter specified by said shift-and-insert instruction, into corresponding bit positions in a second data value stored within a second register with bits within said second data value corresponding to said N shifted-in bits being unaltered thereby forming said result; wherein said shift-and-insert instruction includes a register specifying field specifying a register within a register bank to be used as said first register; and wherein shift-and-insert instruction includes a register specifying field specifying a register within a register bank to be used as said second register.

13. A method as claimed in claim 12, wherein said shift-and-insert instruction includes an immediate value specifying said shift amount of N bit positions.

14. A method as claimed in claim 12, wherein shift-and-insert instruction includes a register specifying field specifying a register within a register bank to be used as a destination register.

15. A method as claimed in claim 14, wherein said register specifying field for said destination register is shared with one of said first register and second register.

16. A method as claimed in claim 12, wherein said first data value is right shifted.

17. A method as claimed in claim 12, wherein said first data value is left shifted.

18. A method as claimed in claim 12, wherein said first data value and said second data value have the same number of bits.

19. A method as claimed in claim 12, wherein, in response to said shift-and-insert instruction, said processing logic is operable to shift said first value.

20. A method as claimed in claim 12, wherein, in response to said shift-and-insert instruction, said processing logic is operable to form a mask value for selecting which bits within said second data value are replaced by corresponding bits within said shifted data value and which bits within said second data value are unaltered.

21. A method as claimed in claim 12, wherein said processing logic is single instruction multiple data processing logic and said first register and said second register are respective portions of a first single instruction multiple data register and a second single instruction multiple data register, said shift-and-insert instruction being operable to control execution in parallel of a plurality of shift-and-insert operations in respective processing lanes.

22. A method as claimed in claim 12, wherein said processing logic is scalar processing logic.

* * * * *